United States Patent
Trimberger

(10) Patent No.: US 8,972,744 B1
(45) Date of Patent: *Mar. 3, 2015

(54) PREVENTING DATA IMPRINTING IN MEMORY

(75) Inventor: Stephen M. Trimberger, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 617 days.

This patent is subject to a terminal disclaimer.

(21) Appl. No.: 12/031,355

(22) Filed: Feb. 14, 2008

(51) Int. Cl.
*G06F 21/70* (2013.01)
*G06F 12/14* (2006.01)

(52) U.S. Cl.
CPC ........ *G06F 12/1408* (2013.01); *G06F 12/1416* (2013.01)
USPC .......................................... 713/189; 713/193

(58) Field of Classification Search
None
See application file for complete search history.

(56) References Cited

U.S. PATENT DOCUMENTS

| | | | | |
|---|---|---|---|---|
| 4,997,288 A * | 3/1991 | Rosenow | .......................... | 380/2 |
| 5,661,730 A | 8/1997 | Mitra et al. | | |
| 6,781,864 B2 | 8/2004 | Basceri et al. | | |
| 6,917,974 B1 * | 7/2005 | Stytz et al. | .................... | 709/225 |
| 7,568,114 B1 * | 7/2009 | Schlafly | ......................... | 713/194 |
| 7,707,371 B1 | 4/2010 | Goheer et al. | | |
| 2003/0094499 A1 * | 5/2003 | Endo et al. | .................... | 235/492 |
| 2004/0250091 A1 * | 12/2004 | Henry et al. | ................... | 713/189 |
| 2005/0238175 A1 * | 10/2005 | Plotkin et al. | ................. | 380/281 |
| 2006/0023486 A1 | 2/2006 | Furusawa et al. | | |
| 2007/0047395 A1 | 3/2007 | Skeeter et al. | | |
| 2007/0098158 A1 * | 5/2007 | Tapson | ............................. | 380/37 |
| 2007/0300031 A1 | 12/2007 | Jevans et al. | | |
| 2008/0002830 A1 * | 1/2008 | Cherkasov et al. | ........... | 380/277 |
| 2008/0126766 A1 | 5/2008 | Chheda et al. | | |
| 2008/0192553 A1 | 8/2008 | Backus et al. | | |
| 2009/0100212 A1 | 4/2009 | Boyd et al. | | |
| 2009/0168487 A1 | 7/2009 | Rodriguez et al. | | |
| 2009/0276514 A1 * | 11/2009 | Subramanian | ................ | 709/223 |
| 2010/0138619 A1 | 6/2010 | Benavides | | |

OTHER PUBLICATIONS

U.S. Appl. No. 12/354,721, filed Jan. 15, 2009, Trimberger.
U.S. Appl. No. 12/354,728, filed Jan. 15, 2009, Trimberger.
Gutmann, Peter; "Data Remanence in Semiconductor Devices. Abstract"; Security '01 Abstract; Security '01 Technical Program; downloaded on Feb. 11, 2008 from http://www.usenix.org/events/sec01/gutmann.html; pp. 1.
Gutmann, Peter; "Secure Deletion of Data from Magnetic and Solid-State Memory"; Sixth USENIX Security Symposium; downloaded on Feb. 5, 2008 from http://www.usenix.org/publications/library/proceedings/sec96/full_papers/gutmann'; pp. 77-90.
Trimberger, Steve; Security in SRAM FPGAs; IEEE Design and Test of Computers; Copublished by the IEEE CS and the IEEE CASS; Copyright 2007 IEEE; pp. 581.
Gutmann, Peter; "Data Remanence in Semiconductor Devices"; Last changes Apr. 30, 2002; pp. 1-19.

(Continued)

*Primary Examiner* — Alexander Lagor
(74) *Attorney, Agent, or Firm* — Annette M. Thompson; LeRoy D. Maunu; Lois D. Cartier

(57) ABSTRACT

A method and system of preventing data imprinting. The data includes a payload and a token that may be stored in a memory. The token provides information about the payload format and determines how that payload may be interpreted. The data field may be corrected and read into a device or may be converted and then written back to the memory.

9 Claims, 5 Drawing Sheets

(56) References Cited

OTHER PUBLICATIONS

Dyer, Joan G. et al.; "Building the IBM 4758 Secure Coprocessor"; Copyright 2001 IEEE; Oct. 2001; pp. 57-66.

Cisco Systems, Inc., *Cisco MDS 9000 Family Secure Erase Configuration Guide*, Jun. 2008, pp. 1-46, Cisco Systems, Inc., San Jose, California, USA.

Kissel, Richard et al., *Guidelines for Media Sanitization*, NIST Special Publication 800-88, Sep. 2006, pp. 1-43, National Institute of Standards and Technology, Computer Security Division, Information Technology Laboratory, Gaithersburg, Maryland, USA.

Kok, Guido R., *Data Remanence in Microcontrollers*, Apr. 2007, pp. 1-17, University of Twente, Enschede, The Netherlands.

* cited by examiner

PREVENTING DATA IMPRINTING IN MEMORY

FIELD OF THE INVENTION

This invention relates generally to data security, and in particular to a method of preventing data imprinting in a memory.

BACKGROUND

Deleting data from magnetic disk media and random-access memory may be accomplished by various methods, such as an erase operation where the memory data is overwritten with other data, a delete operation, or by removing power from the device. However, storing data indefinitely in magnetic disk media or random-access memory results in an aging effect which causes traces or remnants of data to remain even after a deletion or erasure operation has been performed on the memory or power to the memory is shut down.

This aging effect, known as data imprinting, defeats the ability to completely erase information stored in a memory. The data traces or remnants may provide sufficient information to determine what data was previously stored in the memory. The longer the information is stored in a memory cell, the greater the possibility that the data will be preserved by imprinting and subsequently detected even after erasure or deletion. Data imprinting could pose special data storage problems in security or similar private applications where the complete or guaranteed destruction of sensitive data may be highly desired.

SUMMARY

This disclosure describes a method and system to defeat data imprinting. The data field of a memory is configured to store a payload of data in a certain format and a token that may provide information about the payload data format. The token could additionally control and enable the conversion and correction of the payload data.

According to a disclosed class of innovative embodiments, there is provided a method of securing data. The method includes writing a data field to a location in a memory. The data field, comprising a payload and a token, is read from the memory location. The payload of the data field is converted and the token is amended. The converted payload is output, e.g., used in subsequent processing, written back to the memory location, and/or written to a device, such as a processor, communicatively coupled to the memory.

According to a disclosed class of innovative embodiments, there is disclosed a computer program product that includes a computer readable medium that stores executable program code that performs a method of securing data.

According to a disclosed class of innovative embodiments, there is disclosed a system that includes a memory. The memory stores a data field that comprises a payload having a format and a token, associated with the payload, that provides information about the format of the payload.

The embodiments of the disclosure may provide the advantage of minimizing the aging effects of bits in memory, thereby minimizing the effects of data imprinting. For example, if data is complemented at predetermined intervals and written back to the memory, the possibility of aging decreases.

The embodiments of the disclosure may also provide the advantage of an increase in data security. For example, if the data bits stored in memory are complemented or encrypted, even where imprinting does occur, it could be difficult to determine whether the detected remnants in the memory are the true values.

The embodiments of the disclosure may also provide the additional advantage of eliminating the need to perform a time-consuming memory data overwrite to erase previous sensitive data stored in a memory, since the data in the memory may already be indeterminable due to complementing, encrypting, writeback, or some other operation as disclosed herein.

The embodiments of the disclosure may also provide an advantage of a memory in a system that may be quickly and completely cleared or erased by removal of a battery or other power source or other method without any concern that sensitive data could be detected or extracted after erasure.

These and other advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the accompanying drawings, wherein similar or identical reference numerals represent similar or identical items.

DETAILED DESCRIPTION

The innovative teachings of the present disclosure are described with particular reference to presently preferred embodiments. The disclosure should in no way be limited to the implementations, drawings, and techniques illustrated and described herein, but may be modified within the scope of the appended claims along with their full scope of equivalents.

In embodiments of this disclosure, a method of defeating data imprinting is disclosed. Data stored in a memory location may be periodically inverted, complemented, or otherwise converted so that the data that may be imprinted in the memory location because of the storing process may become meaningless. The method involves storing a data field in a particular format in a memory location. The data field may include a token field that may provide information about a payload, another portion of the data field. A system trigger may initiate the reading of the data field from the memory location. The data field read from the memory may be changed using conversion functions. The converted data field may be used in subsequent processing or the converted data field may be written back to memory.

Figure 1A:
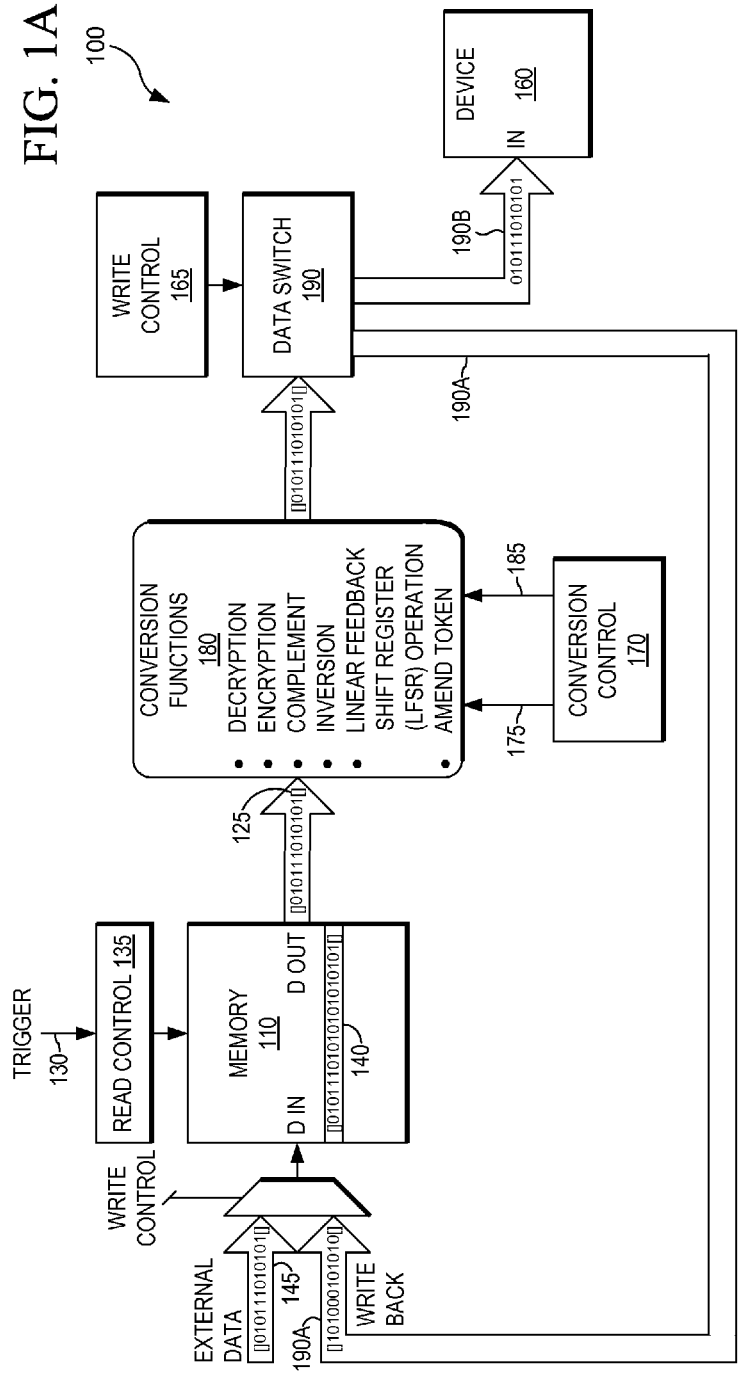
FIG. 1A is a structural flow diagram according to one embodiment of the current disclosure.

FIG. 1A is a schematic diagram 100 that illustrates a structural data path flow according to one embodiment of the current disclosure. Memory 110 may store a data field 140 selected from external data 145 sourced from another device or writeback data 190A that was previously stored in the memory 110, read out, and later rewritten back to the memory 110. The memory 110 may include, but is not limited to, magnetic disk, magnetic tape, EPROM, EEPROM, Flash memory, a static random access memory (SRAM), a dynamic random access memory (DRAM), a battery backed RAM (BBRAM), a tag memory, or some other type of low leakage nonvolatile memory as may be known to one of ordinary skill in the art. In one embodiment, the memory may be a memory organized as 32-bit words which may be serially written or accessed over multiple operational cycles. One of skill in the art should recognize that various memory device types of various organizations and sizes may be used.

Storing data in the memory begins the aging effect that may cause imprinting. In some technologies, storing the data for an indefinite period of time may cause imprinting. For example, the longer the data is stored, the greater the possibility of the data bits leaving a data imprint in a memory cell location or memory data field after the data has been erased or deleted from the location.

In other technologies, write and/or read operations may result in imprinting. For example, in magnetic disk storage devices, magnetic disk drives are comprised of concentric data tracks. The magnetic disk drive may write data by magnetizing a surface of the data track. As the data is written, the magnetic write head of the magnetic disk storage device may be slightly misaligned. This magnetic write head misalignment could cause a slightly off-center region to be magnetized. Subsequent disk writes may occur with the write head being slightly misaligned in a different direction. Over time, a magnetized concentric ring of data may occur around the central data track region. A standard read of the disk will return the data in the central track region. However, due to the misalignment, the off-center region of the magnetized ring could be imprinted with data that may be magnetized in the central region of the ring. An analysis of this data imprinting may result in determining the data that was written to the central track region.

Figure 1B:
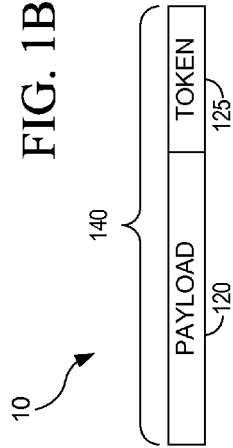
FIG. 1B illustrates the details of the memory block depicted in FIG. 1A.

FIG. 1B illustrates a diagram 10 that details the memory data field 140 that may be stored in a memory 110 according to one embodiment of the disclosure. Memory data field 140 may be organized to include a payload 120 field and a token 125 field. The length and organization of memory data field 140 may vary depending on implementation. For example, the data field 140 may be organized into 32-bit data words or octets of a variable length. Many memory organizations may be possible, as would be readily apparent to one of ordinary skill in the art.

In diagram 10, payload 120 may comprise protected or sensitive data such as a social security number, a password, an encryption key, or other such information that may be considered private. The payload 120 format may have a true, complemented, or encrypted form. Other formats are possible, and one of skill in the art should recognize that other formats are possible and that the exemplary formats listed are not intended to be an exhaustive or exclusive listing.

Token 125 may be represented as a single bit or a multiple bit field. For example, token 125 could be a "1" or a "0" bit or a field of two or more bits such as "10", or "111". Token 125 may also provide information about the format of the payload 120. For example, the token 125 may hold an integer value of "1" if payload 120 is in a complemented format or a "0" value if payload 120 has a true, non-complemented value.

Referring to FIG. 1A, a trigger 130 may activate a read control 135 to read a data field 140 from memory 110. The trigger 130 may be configured to activate upon the powering up of a device 160. Trigger 130 may also be configured to activate based on an external timer. One of ordinary skill in the art should understand that other trigger activation sources may be possible.

The read control 135 may start a read operation on a location in memory 110 to read out a data field 140. In one embodiment, the memory 110 organization may support a simultaneous read of the payload 120 and the token 125 from the memory 110. In another embodiment, the payload 120 and the token 125 may be accessed serially. The memory 110 may be internal to a device 160, such as a field programmable gate array (FPGA), programmable logic device (PLD), processor, or other similar device that would be known to one of skill in the art. The memory 110 may also be external to a device 160 and situated within a system environment.

The data field 140 that is read from the memory 110 may be converted through the operation of conversion control 170. A conversion control function 180 may perform a conversion of the payload 120 in data field 140 and an amendment of the token 125. Amending the token may include, but is not limited to, operations such as deletion, encryption, inversion, addition and decryption.

In one embodiment, conversion control 170 may activate a writeback conversion signal 175 to perform a writeback conversion process. In a writeback conversion process, the data field 140 may be converted and written back to memory 110. Conversion control 170 may operate together with a write control function to control the writeback of data field 140 to the memory 110 location from which it was read. The conversion functions 180 performed on a data field 140 for a writeback conversion may include, but are not limited to, inverting the payload 120 and amending the token 125, or encrypting the payload 120 and amending the token 125. Other writeback conversion operations, including reversible functions such as XOR operations, may be performed, and such operations would be known to one of skill in the art.

In another embodiment, conversion control 170 may activate a correction conversion signal 185 to perform a correction conversion process. In a correction conversion process, the data field 140 may be corrected to its true value and used in subsequent processing. The conversion functions 180 performed on a data field 140 for a correction conversion may include, but are not limited to, decrypting the payload 120 and amending the token 125, or complementing the payload 120 and amending the token.

The conversion control 170 may be activated to perform conversion functions 180 on data field 140 upon a device 160 power-up or when a data field 140 is read from the memory 110 location, for example. In another embodiment, activation of the conversion control 170 may occur each time the data field 140 is read out to be used by other processes or read out to be written back to memory 110. In another embodiment, activation of the conversion control 170 may be controlled by an external device signal, such as an external timer or an internal device signal.

In one embodiment, the conversion functions 180 may include encryption and decryption operation capabilities. In such operations, the payload 120 may function as a secret identifier such as a cryptographic key or part of a cryptographic key. The encryption and decryption operations could be applicable for a correction conversion operation and a writeback conversion operation.

In encryption and decryption operations involving a correction conversion, payload 120 may be passed through a decryption algorithm. The result could then re-decrypted by a decryptor a number of times as may be indicated by token 125. The output of the decryptor would then be the corrected or true data that may be used in further processing.

In encryption and decryption operations involving a writeback conversion, payload 120 may be read from memory and encrypted a number of times. The number of encryptions could be indicated by token 125. Another embodiment of the writeback conversion operation may involve the payload 120 being read from memory 110 and encrypted and the token 125 being incremented. In incrementing the token, it might be possible to exceed the token field or range of the token 125 value. In such a case, the payload 120 may be decrypted a number of times to decrease its value and the token may be reset. The converted payload and amended token may be written back to the memory 110.

In one embodiment, the conversion functions 180 may also include inversion operations. In such operations, the token 125 may be a single bit that is used to indicate whether the payload 120 is stored in true or complement form. In one embodiment, the token 125 value is set to '1' if the payload 120 is complemented and the token 125 value is set to '0' if the payload 120 in not complemented.

The process of inverting and storing inverted bit values may defeat data imprinting, because as the aging effects commence, imprinting may occur with the stored inverted bit values that have been rewritten to the memory field. If memory field erasure occurs, it will be difficult to determine from the imprinting the actual value of the payload bits, since the imprinting could have occurred when the bits were in true form or the imprinting could have occurred when the bits were in inverted or complemented form.

In inversion operations involving a correction conversion, the data field 140 may be read from the memory 110, and all the bits of the payload 120 may be XORed with the token 125 bit. The resulting corrected data may be used in further processing.

In inversion operations involving a writeback conversion, all bits of the payload 120 and the token 125 bit may be inverted. The converted data field may then be written back to memory 110.

In one embodiment, the conversion functions 180 may include a modulo-4 arithmetic operation. In modulo-4 operations, the token 125 may be a two-bit field containing a number to be added to each two-bit subset of the payload 120. In a modulo-4 operation involving a correction conversion, the data field 140 may be read from the memory 110. The two-bit token 120 field may be subtracted from each two bit sub-field of payload 120. In a modulo-4 operation involving a writeback conversion, the data field 140 may be read from the memory 110 and a one bit value may be added to each pair of payload 120 bits and the token 125 bit. The carry-out is dropped and the converted data field including the payload 120 and token 125 may be written back to memory 110.

In one embodiment, the conversion functions 180 may include the use of a Linear Feedback Shift Register (LFSR). An LFSR may be used to generate pseudo-random numbers to scramble the payload 120 bits of the data field 140. The process of randomizing the payload bits may defeat the occurrence of data imprinting, because the bits that are stored are not correlated with the actual or true data that could represent sensitive data. If the aging effects associated with imprinting begin to occur, then the data may not be the true data or have any correlation to the actual or original data values previously stored in the memory.

The token 125 may represent an actual number or, in some embodiments, token 125 may be multiplied by some factor. For example, token 125 may be multiplied by 1000 (×1000) to obtain a modified token result. The modified token result may then be used to step the LFSR. For example, if the value of the token field is "3", i.e., 11, the token field times 1000 (×1000) results in a modified token result of 3000. The modified token result of 3000 may then be used to step the LFSR. The size of the token field may be determined based on the randomization results desired by payload 120.

In LFSR operations involving a correction conversion, the data field 140 may be read from a memory 110. The token 125 may represent the number of times the payload 120 has been stepped or shifted by the LFSR. The output of the LFSR may be XORed with data field 120 to produce the corrected data, which may be used in further processing.

In LFSR operations involving a writeback conversion, the data field 140 is read from a memory 110 and the payload 120 may be input into an LFSR. The LFSR is stepped or shifted another step and the result is XORed with the payload 120. The token 125 may be incremented.

In some LFSR operations, the value of token 125 may be zero. When the token 125 value is zero, the payload in the LFSR may be stepped or shifted by a certain predetermined number, and the resulting payload output may be XORed with the original payload value from the data field.

The converted payload and amended token may be written back to memory 110 via datapath 190A, or may be written to device 160 for further processing through datapath 190B. A data switch 190 or other suitable routing device known to one of skill in the art may be used to select datapath 190A or 1908. A write control function 165 may be used to control data switch 190 to select a desired datapath. It should be noted that the number of datapaths and the size of the control data switch may vary depending on implementation specifications. For example, there may be a plurality of devices in the system that require the use of the converted payload and amended token. In such a case, the number of datapaths and the size of the control data switch may be increased to accommodate the system requirements.

Figure 2:
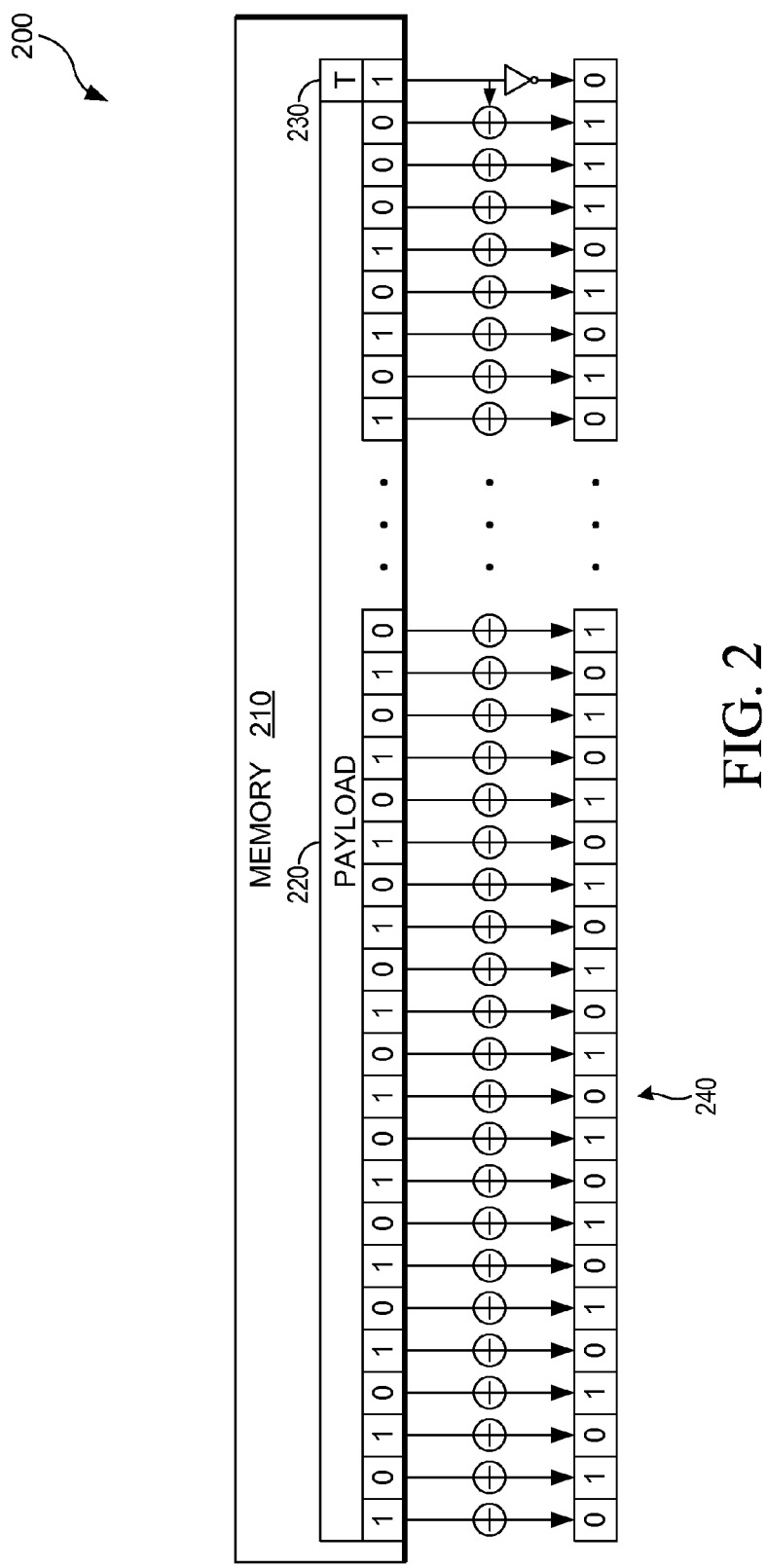
FIG. 2 illustrates the organization and performance of a memory according to one embodiment of the current disclosure.

FIG. 2, diagram 200, illustrates an exemplary embodiment that details the correction of data according to one embodiment. In diagram 200, memory field 210 comprises 257 bits with a payload 220 of 256 bits and a 1-bit token 230 field. For example, the 1-bit token field 230 may be set to a value of "1" to indicate that the payload 220 is an inverted value. The token 230 field and the payload 220 data bits may be read from memory field 210 and an XOR operation, symbolized by ⊕, is performed on the payload 220 data bits using the token 230. The XOR operation performed using the token 230 bit with a value of "1" results in an inversion of the payload 220 bit values. The resulting inverted payload 240 may later be written back and stored into the memory field location from which the original payload 220 bits were read. The token 230 bit may also be amended to indicate the current non-inverted state of the payload 220. Note that the non-inverted state may represent the true value or a complemented value, depending on the implementation.

Figure 3:
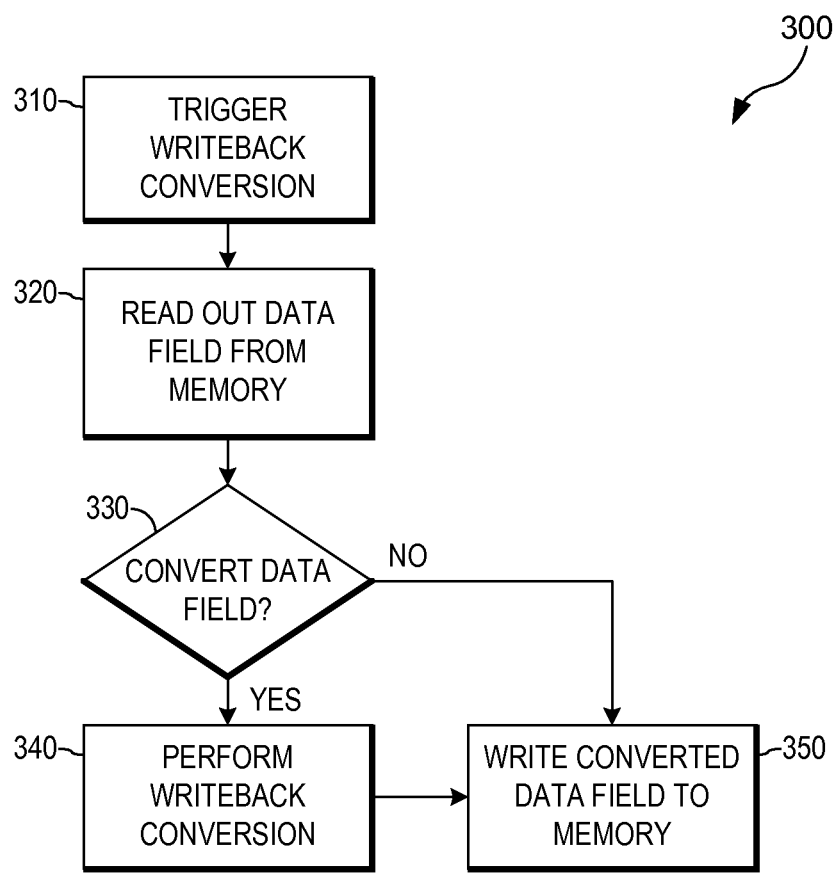
FIG. 3 is a flowchart detailing a conversion process according to one embodiment of the current disclosure as illustrated in FIG. 1A.

FIG. 3 provides a flowchart 300 that illustrates a method of processing the data field from a memory to defeat imprinting, according to one preferred embodiment of the disclosure. A trigger 130, as previously described, may perform an action 310 that initiates the writeback conversion process to perform a data field conversion. The data field may be read from the memory at action 320 for a determination of whether to convert the data field at an action 330. The writeback conversion may be automatic or event triggered. For example, in one embodiment, the writeback conversion process may be configured to perform a data field conversion automatically upon power-up. In another embodiment, a timer may track a predetermined length of time and indicate when a writeback conversion may occur.

An affirmative determination to perform a writeback conversion at action 330 may enable a writeback conversion to be performed at action 340. The writeback conversion may include determining from a token bit or field whether or not the payload portion of the data is in a true or complemented format, and inverting or complementing the payload to an alternate format accordingly. For example, if the token indicates that the data is in true format, then the payload may be inverted or complemented using the token. If the token indicates that the payload is in an inverted or complemented data form, the payload may be converted to a true data form. The token may be amended to provide the correct format information. In one embodiment, the payload and token bits of the data field may be inverted, or complemented simultaneously.

The data field comprising the converted payload and the amended token may be written back to the location of memory from which it was read and stored at action 350. The aging process could again commence, over time, at the locations where the data field bits are stored, but because the data field bits are different from the originally stored data, it would be difficult to discern the actual data bit values.

Figure 4:
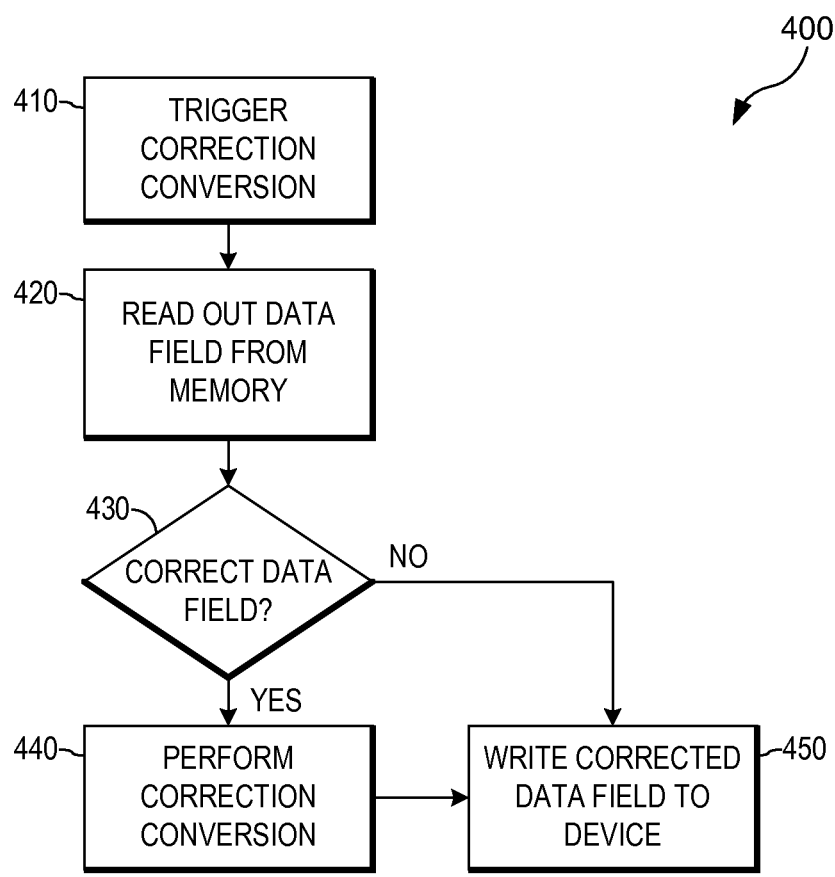
FIG. 4 is flowchart detailing a conversion process according to another embodiment of the current disclosure as illustrated in FIG. 1A.

FIG. 4 provides a flowchart 400 which illustrates the method of using the data stored in memory, according to one embodiment of the disclosure. The correction conversion process of flowchart 400 initiates with a trigger of a data field read at action 410. The data field is read from memory at action 420.

A determination may be made at action 430 of whether to correct the data field. The token portion of the data field provides the information regarding whether the payload portion of the data field is in a true, complemented, or other format. If no correction of the data field is required, the payload portion of the data field is used by the device at action 450. If a decision is made at action 430 to correct the data field, the correction conversion may be performed at an action 440. The correction conversion may result in obtaining the true values of the payload 120 and the true values may be used by a device at action 450.

Figure 5:
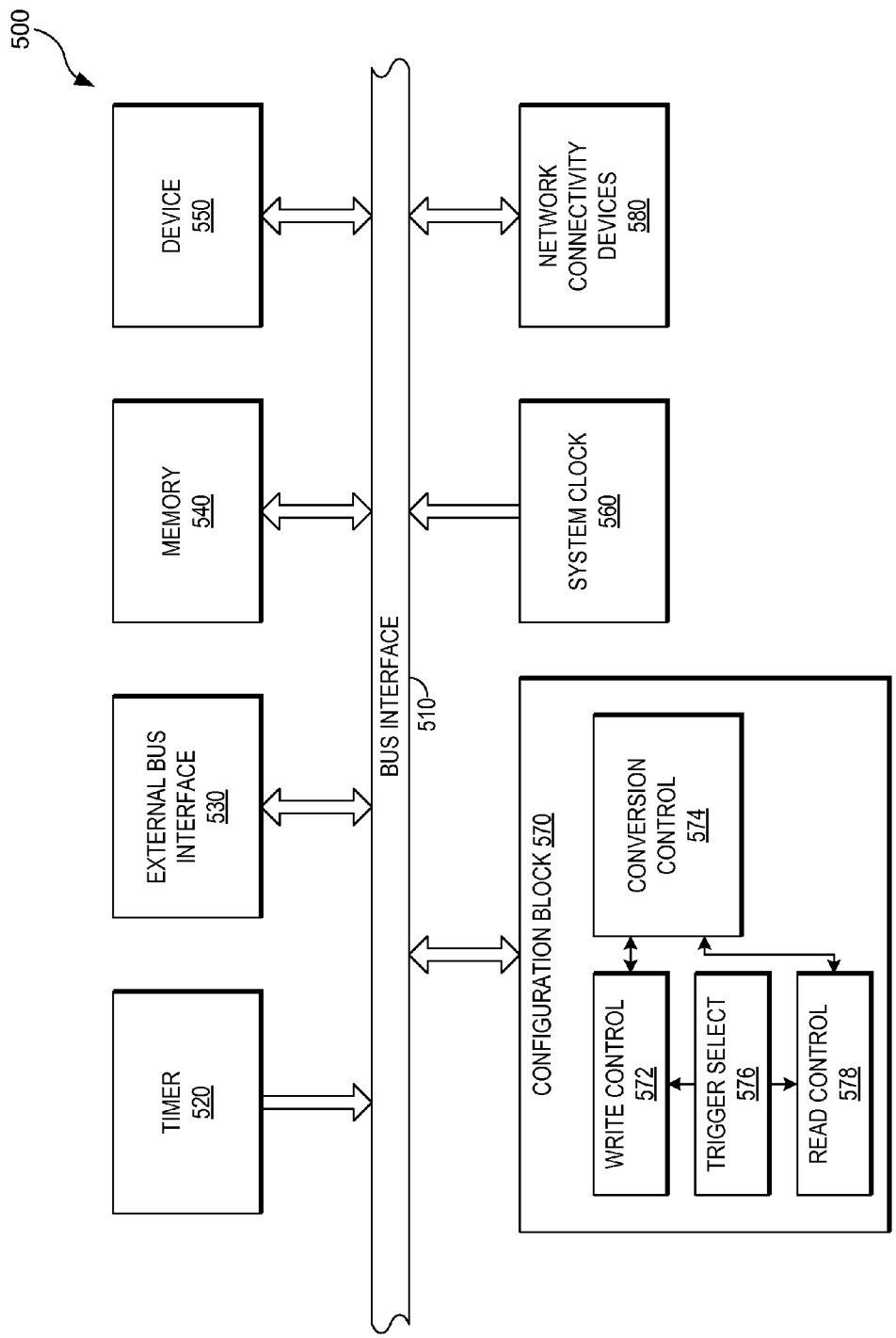
FIG. 5 is a block diagram of an exemplary environment that may be operable for various embodiments of the current disclosure.

The methods described herein may be implemented by any memory device or information processing system that uses devices for the storage of data. FIG. 5 illustrates an exemplary system suitable for implementing the embodiments disclosed herein. System 500 includes a memory 540 in communication with a device 550 through a bus interface 510. System 500 may also include a timer 520, external bus interface 530, system clock 560, configuration block 570, and network connectivity devices 580, for example. Memory 540 may be external or internal to device 550. In a preferred embodiment, memory 540 may be a low leakage battery-backed RAM (BBRAM). The low leakage feature of the BBRAM would potentially extend the life of the battery and is energy efficient. However, other types of memory devices may be used, as would be recognized by one of skill in the art.

In one embodiment, the device 550 may be a central processing unit that executes instructions, codes, computer programs, and scripts, which it may access from a memory 540 or other network connectivity devices. Memory 540 may include computer readable media such as a RAM, ROM, PROM, hard disk, floppy disk, optical disk, or other secondary storage media. In another embodiment, device 550 may be a programmable logic device (PLD).

The network connectivity devices 580 may take the form of modems, modem banks, Ethernet cards, universal serial bus (USB) interface cards, serial interfaces, token ring cards, fiber distributed data interface (FDDI) cards, wireless local area network (WLAN) cards, and other well-known network devices. The network connectivity devices 580 may enable the device 550 to communicate with an Internet or one or more intranets. The network connection may enable the device 550 to receive information from a network or output information to the network in the course of performing the methods of the disclosure. The information may be represented as a sequence of instructions to be executed using device 550.

The bus interface 510 of system 500 may couple to and provide communication among the other system components, which may also include, but are not limited to, timer 520, external bus interface 530, system clock 560, configuration block 570, and network connectivity devices 580.

Configuration block 570 may include various components that control the processes in embodiments of this disclosure. Specifically, in configuration block 570, write control 572 may control the write processes to and from memory 540. Write control 572 may also control the write processes from memory 540 to device 550. Trigger select 576 may process the conditions and output a trigger that initiates the data field read from memory 540. Read control 578 may determine what data locations are read from the memory.

Conversion control 574 may determine whether a writeback conversion or correction conversion operation should be performed. One of skill in the art should recognize that the components of configuration block 570 may vary based on implementations. Other component blocks may be required to implement system functions specific to a given design implementation.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various methods, techniques, or elements may be combined or integrated in another system, or certain features may be omitted or not implemented.

Also, techniques, systems, subsystems and methods described and illustrated in the various embodiments as discrete or separate may be combined or integrated with other systems, modules, techniques or methods without departing from the scope of the present disclosure. Other examples of modifications, variations, substitutions, and alterations will be recognizable by one skilled in the art and could be made without departing from the spirit and scope disclosed herein.

As will be recognized by those skilled in the art, the innovative concepts described in the present disclosure can be modified and varied over a tremendous range of applications. The scope of patented subject matter is intended to embrace all such alternatives, modifications, and variations that fall within the spirit and broad scope of the appended claims.

For example, one notable variation could be that the data field conversion and writeback could be carried out by a processor. The device may be a PLD, which may include a processor and other memory such as a PROM. The processor would read the data from a memory location, convert the data, and may write back the data to the same memory location.

Further, none of the description in the present disclosure should be read as implying that any particular element, act, or function is an essential element which must be included in the claim scope: The scope of patented subject matter is defined only by the claims.

The claims, as filed, are intended to be as comprehensive as possible, and no subject matter is intentionally relinquished, dedicated, or abandoned.

What is claimed is:

1. A method of securing data, the method comprising:
writing a data field to a location in a memory, the data field comprising a payload and a token associated with the payload;
reading out the payload and the token from the location in the memory, wherein the token indicates a number of times the payload is encrypted;
encrypting the payload read from the memory location;
incrementing the token read from the memory location;
writing the encrypted payload and the incremented token back to the memory location; and
periodically repeating the reading, encrypting, incrementing and writing back in response to a signal from a timer to avoid data imprinting; and
in response to reading the token and a value of the token being less than a selected value, performing the encrypting, incrementing, and writing back to the memory location; and
in response to reading the token and a value of the token being equal to the selected value, performing operations including:
decrypting the payload a number of times; decrementing the token by the number of times; and
writing the payload decrypted the number of times and the decremented token back to the memory location.

2. The method of claim 1, further comprising: determining a format of the payload by inspecting the token; and
responsive to determining the format of the payload, correcting the payload to obtain a true value.

3. The method of claim 1, wherein the encrypting of the payload comprises:
loading the payload into a pseudo-random number generator; and stepping the pseudo-random number generator a predetermined number of times.

4. The method of claim 1, wherein the data field comprises a plurality of payloads and a token associated with each payload.

5. A computer program product, comprising:
a non-transitory computer readable medium storing executable program code, which when executed by an information processing system, causes the information processing system to perform a method comprising:
writing a data field to a location in a memory, the data field comprising a payload and a token associated with the payload;
reading out the payload and the token from the location in the memory, wherein the token indicates a number of times the payload is encrypted;
encrypting the payload read from the memory location;
incrementing the token read from the memory location;
writing the encrypted payload and the incremented token back to the memory location; and
periodically repeating the reading, encrypting, incrementing and writing back in response to a signal from a timer to avoid data imprinting;
wherein the program code executed by the information processing system further causes the information processing system to perform operations including:
in response reading the token and a value of the token being less than a selected value, performing the encrypting, incrementing and writing back to the memory location; and
in response to reading the token and a value of the token being equal to the selected value, performing operations including:
decrypting the payload a number of times; decrementing the token by the number of times; and
writing the payload decrypted the number of times and the decremented token back to the memory location.

6. A system for securely processing information, comprising:
a memory, the memory storing a data field in a memory location, the data field comprising:
a payload, the payload having a format; and
a token that indicates a number of times that the payload is encrypted; and
circuitry coupled to the memory, the circuitry being configured to:
read out the payload and the token from the memory location, wherein the token indicates a number of times the payload is encrypted;
encrypt the payload read from the memory location;
increment the token read from the memory location;
write the encrypted payload and the incremented token back to the memory location;
periodically repeat the reading, encrypting, incrementing and writing back in response to a signal from a timer to avoid data imprinting;
in response to reading the token and a value of the token being less than a selected value, perform the encrypting, incrementing and writing back to the memory location; and
in response to reading the token and a value of the token being equal to the selected value, perform operations including:
decrypting the payload a number of times; decrementing the token by the number of times; and
writing the payload decrypted the number of times and the decremented token back to the memory location.

7. The system of claim 6, further comprising: a device communicatively coupled to the memory.

8. The system of claim 7, wherein the device comprises a processor.

9. The system of claim 6, wherein the memory comprises a battery-backed RAM (BBRAM).

* * * * *